G. L. STEVENS.
SOFT TIRE ALARM.
APPLICATION FILED AUG. 20, 1917.
1,276,435.
Patented Aug. 20, 1918.
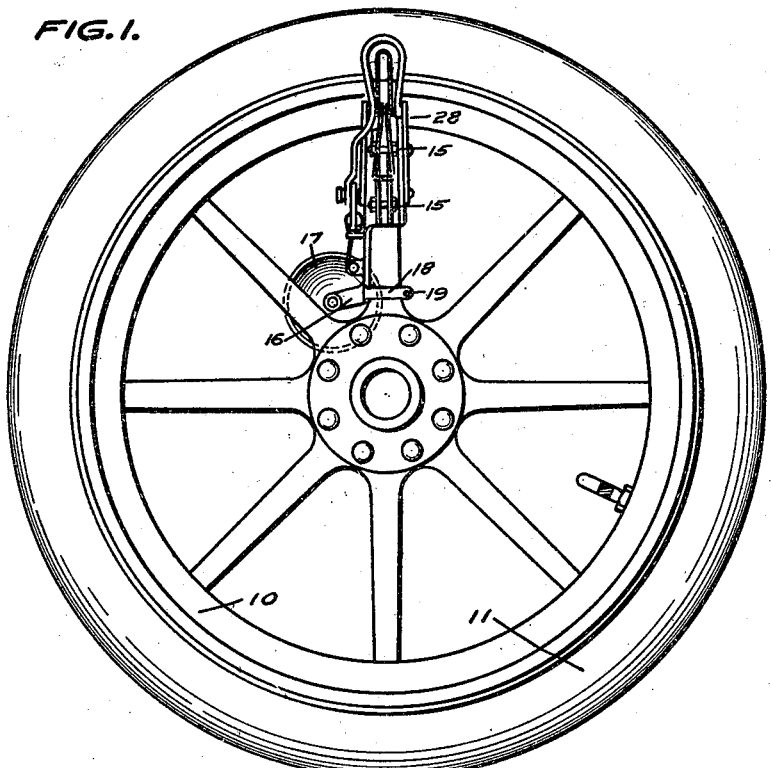
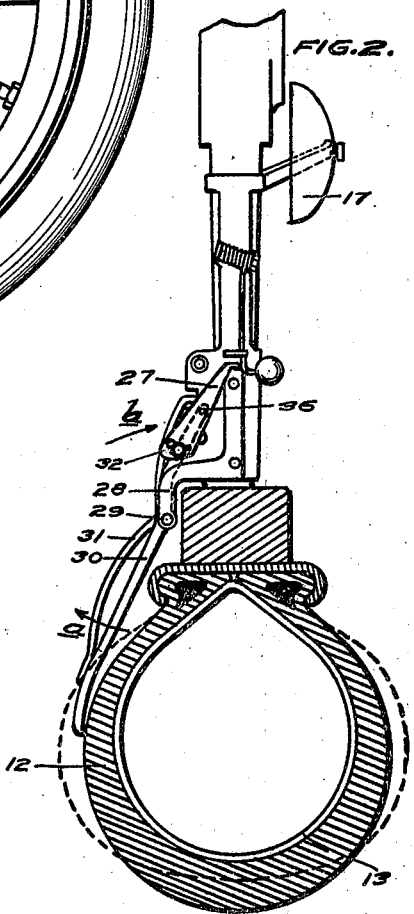
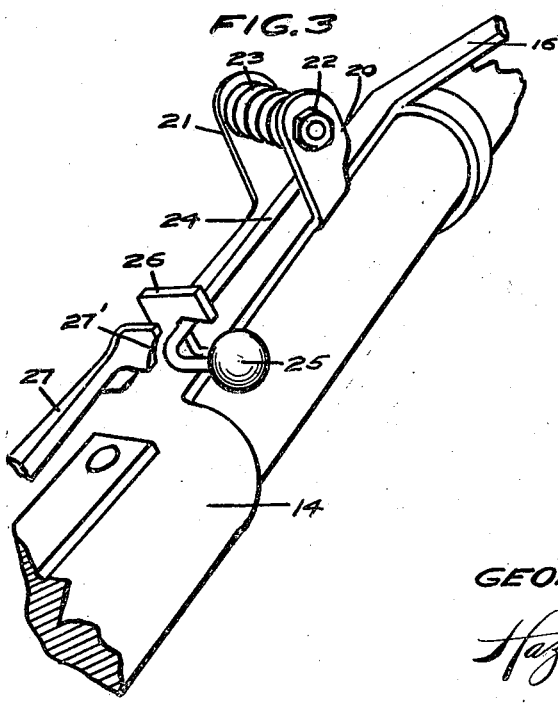
INVENTOR
GEORGE L. STEVENS
Hazard & Miller
ATT'YS

UNITED STATES PATENT OFFICE.

GEORGE L. STEVENS, OF LONG BEACH, CALIFORNIA.

SOFT-TIRE ALARM.

1,276,435. Specification of Letters Patent. Patented Aug. 20, 1918.

Application filed August 20, 1917. Serial No. 187,278.

*To all whom it may concern:*

Be it known that I, GEORGE L. STEVENS, a subject of the King of Great Britain, residing at Long Beach, in the county of Los Angeles and State of California, have invented new and useful Improvements in Soft-Tire Alarms, of which the following is a specification.

This invention relates to an alarm mechanism and particularly pertains to a tire alarm.

The principal object of this invention is to provide a device which may be applied to a vehicle wheel and disposed in relation to a pneumatic tire in such a manner as to cause an alarm to be sounded when the tire has become deflated.

Other objects will appear hereinafter.

The invention is illustrated, by way of example, in the accompanying drawings in which:

Figure 1 is a view in side elevation illustrating a vehicle wheel equipped with a pneumatic tire and further provided with the tire alarm with which the present invention is concerned.

Fig. 2 is a view in transverse section as seen through a fragmentary portion of the vehicle wheel and its tire, particularly disclosing in detail the elements of one form of the alarm mechanism and their relation to the wheel.

Fig. 3 is a fragmentary view in perspective illustrating the trip mechanism of the alarm device.

Referring more particularly to the drawings, 10 indicates a vehicle wheel upon which is mounted a pneumatic tire 11, consisting of an outer casing 12 and an inner tube 13. The wheel here shown is of the artillery type, although it will be understood that the mounting of the device may be varied to accommodate wheels of other designs. Secured upon one spoke of the wheel is a bracket 14 which encircles the spoke and is clamped at intervals by bolts 15. One end of this bracket extends inwardly along the side of the spoke to form a mounting 16 upon which the bell 17 is fastened. This mounting is further secured to the spoke by straps 18 and a bolt 19. Ears 20 and 21 are formed as part of the extension and are adapted to receive a bolt 22 around which the coiled end 23 of a resilient bell striker 24 is mounted. These ears are not positioned directly opposite each other, but are staggered to support the bolt in an angular position, thereby allowing the striker to lie closely against the spoke. This striker extends outwardly along the side of the spoke and is bent at its outer end where it is fitted with a hammer 25 adapted to strike the bell 17 when released from a catch 26. This catch is also formed as a part of the main fitting 14 and is integral therewith. The hook portion of the catch is adapted to receive the shank of the striker and hold it against tension of the coil 23.

The striker is automatically released by a trip arm 27 pivoted to an extension bracket 28 by means of a pivot pin 29. As particularly shown in Fig. 3 of the drawings, the trip arm 27 is provided with an inclined face 27' which acts to wedge the striker downwardly as it swings against and thus engages it from the hook. The trip arm is further provided with a tire engaging extension 30 which passes down alongside the tire felly and partially over-laps the side of the tire casing. A tension spring 31 normally holds the portion 30 against the tire and the opposite portion 27 out of engagement with the striker.

In order that the device may be adjusted for use with tires of different dimensions, the trip lever is formed in two parts, the end portion being pivotally secured to the body portion by means of a pin 36 and thereafter adjustably locked by a lock bolt 32, as particularly shown in Fig. 2. In this manner the end of the lever may be moved in and out so that it will engage the striker at any predetermined point in the course of the deflation of the tire.

In the operation of the device the striker is drawn over against the force of its coiled end 23 and is hooked beneath the catch 26. While the tire is inflated the trip arm 27 will not engage the striker, but when the tire becomes deflated the extension 30 of the trip arm will swing outwardly as indicated by the arrow —a— in Fig. 2 and will cause the opposite end 27 to swing inwardly in the direction indicated by the arrow —b— in the same figure. This movement will spring the striker arm from beneath the catch 26 and allow it to swing free until it strikes the bell 17, thus producing a warning sound.

It will thus be seen that the device here shown is simple in its construction and will bear such relation to the tire as to insure that an alarm will be sounded when the tire is deflated.

While I have shown the preferred construction of my tire alarm as now known to me, it will be understood that various changes in the combination, construction and arrangement of parts may be made by those skilled in the art without departing from the spirit of my invention as claimed.

I claim:

In a tire alarm, the combination with a vehicle wheel upon which is mounted a pneumatic tire, of a mounting bracket secured to one of the spokes of said wheel, a trip arm pivotally secured to the mounting bracket and yieldably held against the side of the tire, a bell secured at the opposite end of said bracket, and a bell striker mounted upon the bracket and adapted to be released by the trip arm to strike the bell when the tire becomes deflated.

In testimony whereof I have signed my name to this specification.

GEORGE L. STEVENS.

Copies of this patent may be obtained for five cents each, by addressing the "Commissioner of Patents, Washington, D. C."